United States Patent
Bert et al.

(10) Patent No.: US 12,045,118 B2
(45) Date of Patent: *Jul. 23, 2024

(54) NODE COHERENCY FOR STORAGE RELATED DATA

(71) Applicant: Micron Technology, Inc., Boise, ID (US)

(72) Inventors: Luca Bert, San Jose, CA (US); Joseph H. Steinmetz, Loomis, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,334

(22) Filed: Aug. 8, 2023

(65) Prior Publication Data

US 2023/0409420 A1    Dec. 21, 2023

Related U.S. Application Data

(63) Continuation of application No. 17/117,292, filed on Dec. 10, 2020, now Pat. No. 11,775,368.

(51) Int. Cl.
  *G06F 11/07*  (2006.01)
  *G06F 3/06*   (2006.01)
  *G06F 11/30*  (2006.01)

(52) U.S. Cl.
  CPC ........ *G06F 11/0727* (2013.01); *G06F 3/0619* (2013.01); *G06F 3/0629* (2013.01); *G06F 3/0659* (2013.01); *G06F 3/067* (2013.01); *G06F 11/0772* (2013.01); *G06F 11/3034* (2013.01)

(58) Field of Classification Search
  CPC ............ G06F 11/0727; G06F 11/0772; G06F 11/3034
  See application file for complete search history.

(56) References Cited

U.S. PATENT DOCUMENTS

| | | | |
|---|---|---|---|
| 8,798,050 B1 | 8/2014 | Gandhi | |
| 9,876,735 B2 * | 1/2018 | Davis | ................... H04L 49/101 |
| 2015/0006831 A1 | 1/2015 | Keshavamurthy | |
| 2015/0046610 A1 | 2/2015 | Aster | |
| 2017/0242745 A1 | 8/2017 | Sherlock | |
| 2018/0167306 A1 | 6/2018 | Hsiao | |
| 2018/0329790 A1 | 11/2018 | Prasad | |
| 2019/0196994 A1 | 6/2019 | Mitra | |
| 2020/0356515 A1 * | 11/2020 | Olarig | ................ G06F 13/4068 |

* cited by examiner

*Primary Examiner* — Jigar P Patel
(74) *Attorney, Agent, or Firm* — Lowenstein Sandler LLP

(57) ABSTRACT

Operations include identifying a system failure affecting visibility, to at least one dual port node of a plurality of dual port nodes, of at least one of a first volume of a plurality of volumes of a first memory device or a second volume of the plurality of volumes, and modifying a visibility configuration to address the system failure. Each volume of the plurality of volumes includes a persistent memory region (PMR). Modifying the visibility configuration includes modifying the visibility of at least one of the first volume or the second volume to the at least one dual port node of the plurality of dual port nodes through its first port or its second port via the at least one switch domain of the plurality of switch domains.

20 Claims, 7 Drawing Sheets

NODE COHERENCY FOR STORAGE RELATED DATA

CROSS-REFERENCE TO RELATED APPLICATION(S)

The present application is a continuation of U.S. patent application Ser. No. 17/117,292, filed on Dec. 10, 2020 and entitled "NODE COHERENCY FOR STORAGE RELATED DATA", the entire contents of which are hereby incorporated by reference.

TECHNICAL FIELD

Embodiments of the disclosure relate generally to memory sub-systems, and more specifically, relate to node coherency for storage related data.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
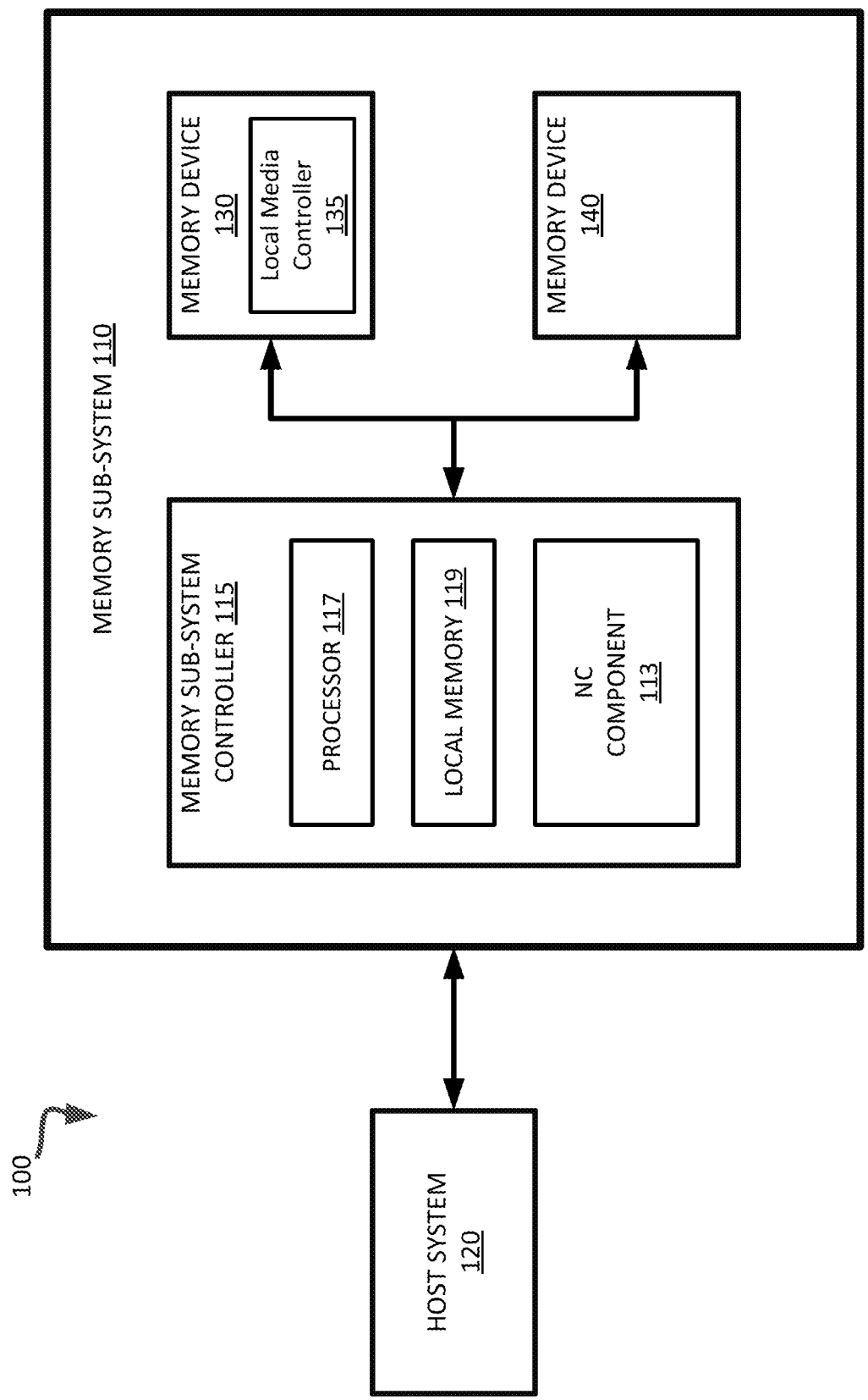
FIG. 1 illustrates an example computing system that includes a memory sub-system in accordance with some embodiments of the present disclosure.

Aspects of the present disclosure are directed to node coherency for storage related data. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device in a memory sub-system, such as a solid-state drive (SSD), can be accessed by a logical-device interface attached via a communications bus. One example of such a logical-device interface for accessing a memory device is Non-Volatile Memory Express (NVMe). A node (e.g., a host system) can access the memory sub-system via, e.g., a Peripheral Component Interconnect Express (PCIe) bus, and the access to the memory device(s) of the memory sub-system can be referred to herein as PCIe NVMe. A memory sub-system (e.g., SSD) can include a memory resource corresponding to an area of readable persistent memory, referred to as a persistent memory region (PMR). More specifically, the PMR can be a byte-addressable memory region accessible through a base address register (BAR), and can be implemented as a power-protected volatile memory device (e.g., dynamic random-access memory (DRAM)). For example, an NVMe connected memory device can include a PMR, with such a device being referred to as an NVMe PMR device.

Storage related data, such as storage metadata, logs, check data, etc., can be of a small size (e.g., a few bytes), can be written very frequently (e.g., every data write or every few data writes), and highly critical (i.e., needed to support other data). Such storage related data is generally not stored in storage devices, at least because traversing an entire storage stack would take a very long time and it would be impractical to fit in a block (e.g., fitting a few bytes in a 4 KB block is a waste of space and efficiency). Rather, such storage related data is typically stored in volatile memory (e.g., DRAM). Accordingly, if a node dies, storage related data on a memory sub-system associated with the node can become inaccessible to any other node and thus create a potential data loss or consistency hole.

The above-noted problem had been addressed with the introduction of High Availability/Failover systems, in which memory sub-systems are simultaneously connected to multiple host systems (e.g., a dual port approach) such that the failure of one node can be overcome by having at least one other node pick up (e.g., via a fail over process) the data that the defunct node was utilizing. For example, in the dual port approach, a second node can pick up the data on which a defunct first node was operating. However, with the advent of fast storage (e.g., SSD storage), such methods, while functional, have become impractical for the above-noted storage related data.

One solution to this impracticability problem has been the use of non-volatile dual in-line memory modules (NVDIMMs). More specifically, an NVDIMM can be mirrored so that the NVDIMM is split between a local node and a remote (mirror) node. For example, a 32 GB NVDIMM could split with 16 GB assigned to the local node and 16 GB assigned to the remote node. Each node can write its own portion using a network interface card (NIC) with remote direct memory access (RDMA) for performance. For example, data can be stored on an SSD and accessible from a port, and metadata can be mirror copied on the NVDIMM over the NIC. Upon failure, the system can pick up data from storage using metadata in the NVDIMM simply by picking up the remote node section as well.

The NVDIMM failover model has some limitations, however. For example, NVDIMM uses dynamic random-access memory (DRAM) slots, which are expensive assets. If the DRAM slots are used for NVDIMM, then they cannot be usable for regular DRAM. Moreover, while mirroring across nodes can work well for a two-node failover, larger systems may not be able to efficiently use a mirror (e.g., a four-node cluster will need cross-copies on 3 additional nodes, which is impractical). Additionally, it can be expensive to use a NIC with RDMA and can require a dedicated network consuming multiple interface slots (e.g., PCIe slots). For example, a 1 rack unit (1U) server can only have one interface slot.

Aspects of the present disclosure address the above and other deficiencies by providing a memory sub-system that enables node coherency for storage related data (e.g., storage metadata, logs and/or check data). More specifically, aspects of the present disclosure provide mechanisms to expose a PMR in the event of system failover. The node coherency can provide for a failover model that can replace other failover models (e.g., NVDIMM mirroring). A memory device described herein (e.g., a memory device of an SSD) can include a number of volumes each including a namespace and a PMR for storing the storage related data. Each volume can be visible to at least one node of the host system in an initial configuration and, in response to a system failure (e.g., node failure and/or switch domain failure). Visibility to each volume can be provided to any number of nodes without need for replication by modifying the initial visibility configuration.

Node coherency described herein can be interface standard agnostic of an interface standard associated with the PMR. For example, the PMR can be associated with a first interface standard or a second interface standard. The second interface standard can be an interface standard that implements one or more alternate protocols supported by the first interface standard. In general, a processor port can be used to negotiate (e.g., auto-negotiate) to either a protocol of the first interface standard or the one or more alternate protocols. In one embodiment, the first interface standard is PCIe (e.g., PCIe NVMe) and the second interface standard is compute express link (CXL). Generally, CXL is an interface standard that can support a number of protocols, including a CXL.io protocol, a CXL.mem protocol and a CXL.cache protocol. PCIe traffic can run through the CXL.io protocol, and the CXL.mem and CXL.cache protocols can share a common link layer and transaction layer, such that the CXL protocols can be multiplexed and transported via a PCIe physical layer. One advantage of using a PCIe interface standard is that PCIe is well-known with clear rules and implementation details. However, the disadvantages of the PCIe embodiment include non-cacheability. For example, the Extensible Firmware Interface (EFI) or Basic Input/Output System (BIOS) and operating system (OS) are not designed to map large amounts on non-cacheable memory. As another example, by being non-cacheable, the data structure is harder to handle and the file system may not be able to efficiently map the memory (and special code can still be needed). Use of a more cacheable interface standard (e.g., CXL) is advantageous in that mapping and sizing is not a problem.

Advantages of the present disclosure include, but are not limited to, reduced cost due to not needing a dedicated NIC for cross-traffic, lack of need for mirror copies since the memory is not owned by a node so a node failure will not include the memory, and reduced size needed for RDMA due to lack of need to mirror the PMR memory (e.g., if a current RDMA can use 32 GB, only 16 GB will be needed). Additionally, the embodiments described herein can scale linearly beyond the 2-node limit of mirroring with little to no additional cost. In contrast, for a larger node cluster (e.g., 16 nodes), NIC mirroring can be very limited or impossible.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical node interface. Examples of a physical node interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical node interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical node interface (e.g., PCIe bus). The physical node interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external node, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include node interface circuitry to communicate with the host system 120 via the physical node interface. The node interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The node coherency (NC) component 113 can enable node coherency for storage related data (e.g., storage metadata, logs and/or check data) by providing a mechanism to expose a PMR in the event of failover. More specifically, the NC component 113 can initialize a visibility configuration to enable visibility of each of a number of volumes of a first memory device to at least one of a number of nodes (e.g., host systems), identify a system failure affecting the visibility of at least one of the number of volumes of the first memory device, and modify the visibility configuration to address the system failure. For example, identifying the system failure can include identifying a failure of a node of the number of nodes. As another example, identifying the system failure can include identifying a failure of a switch domain. The operations performed by the NC component 113 can be performed agnostic of an interface standard. For example, the interface standard can be a first interface standard or a second interface standard. The second interface standard can be an interface standard that implements one or more alternate protocols supported by the first interface standard. In one embodiment, the first interface standard is PCIe (e.g., PCIe NVMe) and the second interface standard is CXL. For example, a namespace of a volume can be accessed via PCIe or CXL.io, and a PMR of a volume can be accessed via, e.g., CXL.mem. Further, two ports can each be connected to a different switch domain, with each port running PCIe and/or CXL depending on the initial visibility configuration. In some embodiments, the memory sub-system controller 115 includes at least a portion of the NC component 113. In some embodiments, the NC component 113 is part of the host system 120, an application, or an operating system. In other embodiments, local media controller 135 includes at least a portion of NC component 113 and is configured to perform the functionality described herein. Further details with regards to the operations of the NC component 113 are described below.

Figure 2:
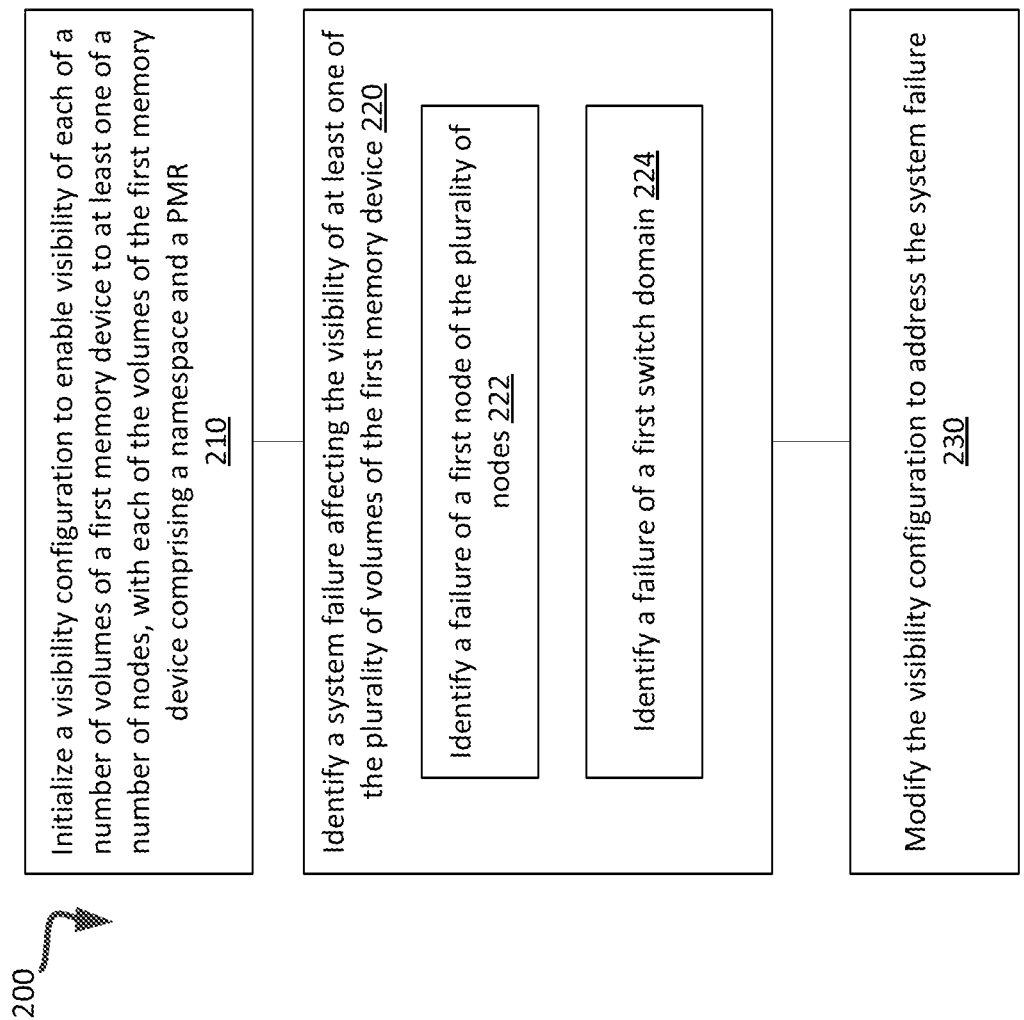
FIG. 2 is a flow diagram of an example method to implement node coherency for storage related data in accordance with some embodiments of the present disclosure.

FIG. 2 is a flow diagram of an example method 200 to implement node coherency for storage related data, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the NC component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, the processing logic initializes a visibility configuration to enable visibility of each of a number of volumes of a first memory device of a system to at least one of a number of nodes with each of the number of volumes of the first memory device including a namespace and a PMR. For example, the nodes can include host systems. That is, the visibility configuration is an assignment of exposure of a volume to a corresponding node. The visibility configuration can be initialized through configuration commands. For example, in one visibility configuration certain volumes of the first memory device are exposed to certain nodes (i.e., visible to and accessible by those nodes for purposes of programming and/or reading data), while in another visibility configuration, different volumes can be exposed to the same or different nodes or the same volumes can be exposed to different nodes. The PMR can be configured to store storage related data (e.g., storage metadata, logs and/or check data). The PMR and namespace of a given volume are treated as atomic, meaning that the PMR and namespace of the given volume are not individually reassigned to another node. Accordingly, logic managing the failover process can move or switch the namespace and PMR in the same command. In one embodiment, the first memory device is an SSD device (e.g., NVMe PMR device). The PMR can be associated with any suitable interface standard. For example, the PMR can be associated with a first interface standard or a second interface standard. The second interface standard can be an interface standard that implements one or more alternate protocols supported by the first interface standard. In one embodiment, the first interface standard is PCIe (e.g., PCIe NVMe) and the second interface standard is CXL.

At operation 220, the processing logic identifies a system failure affecting the visibility of at least one of the number of volumes of the first memory device. As will be described in further detail below, one example of a system failure is a failed switch domain, and another example of a system failure is a failed node. The system failure can identified using any suitable method for system failure detection. For example, if communications from a system component (e.g., switch domain, node) stop being received, the system can receive a signal that the system component has failed (e.g., using a heartbeat monitoring technique).

At operation 230, the processing logic modifies the visibility configuration to address the system failure. More specifically, the processing logic can modify visibility of the at least one of the number of volumes of the first memory device through other ports within the system. For example, modifying the visibility configuration can include, in response to identifying a node failure having visibility assigned to the at least one volume, determining that the another node should take over, and using administrator configuration commands to tell the first memory device to expose the namespace and PMR of the at least one volume to the other node (e.g., two commands). The other node can then detect a hot addition of storage to run a hot plug stack, and transactions and I/O can be restored after completion.

In one embodiment, the number of nodes includes a first node and a second node, the number of volumes of the first memory device includes a first volume and a second volume, and the visibility configuration includes visibility of the first volume to the first node and visibility of the second volume to the second node. Identifying the system failure can include, at operation 222, identifying a failure of the first node. Modifying the visibility configuration to address the system failure at operation 230 can include causing the first volume to be visible to the second volume.

In one embodiment, the system further includes a switch domain, the number of nodes includes a first node and a second node, and the visibility configuration includes visibility of at least a given volume of the number of volumes of the first memory device to the first node through the switch domain. Identifying the system failure can include, at operation 222, identifying a failure of the first node. Modifying the visibility configuration to address the system failure at operation 230 can include causing the given volume to be visible to the second node via the switch domain.

In one embodiment, the system further includes a first switch domain and a second switch domain. The number of nodes includes a node having a first port and a second port and the number of volumes of the first memory device includes a first volume and a second volume. The visibility configuration includes visibility of the first volume to the node through its first port via the first switch domain and visibility of the second volume to the node through its second port via the second switch domain. Identifying the system failure can include, at operation 224, identifying a failure of the first switch domain. Modifying the visibility configuration to address the system failure at operation 230 includes causing the first volume to be visible to the node through its second port via the second switch domain.

In some embodiments, the system further includes a first switch domain and a second switch domain and a second memory device including a number of volumes each having a PMR and a namespace. The number of nodes includes a first node, a second node and a third node each having a first port and a second port, the number of volumes of the first memory device includes a first volume and a second volume, the number of volumes of the second memory device includes a third volume and a fourth volume. The visibility configuration includes visibility of the first and second volumes to the first node through respective ones of its first and second ports via respective ones of the first and second switch domains, visibility of the third volume to the second node through its first port via the first switch domain, and visibility of the fourth volume to the third node through its second port via the second switch domain.

In one embodiment, identifying the system failure can then include, at operation 222, identifying a failure of the first node. Modifying the visibility configuration to address the system failure at operation 230 includes causing the first volume to be visible to the second node through its second port via the second switch domain, and causing the second volume to be visible to the third node through its first port via the first switch domain.

In another embodiment, identifying the system failure can then include, at operation 224, identifying a failure of the first switch domain. Modifying the visibility configuration to address the system failure at operation 230 includes causing the first volume to be visible to the first node through its second port via the second switch domain, and the third volume to be visible to the second node through its second port via the second switch domain.

Figure 3:
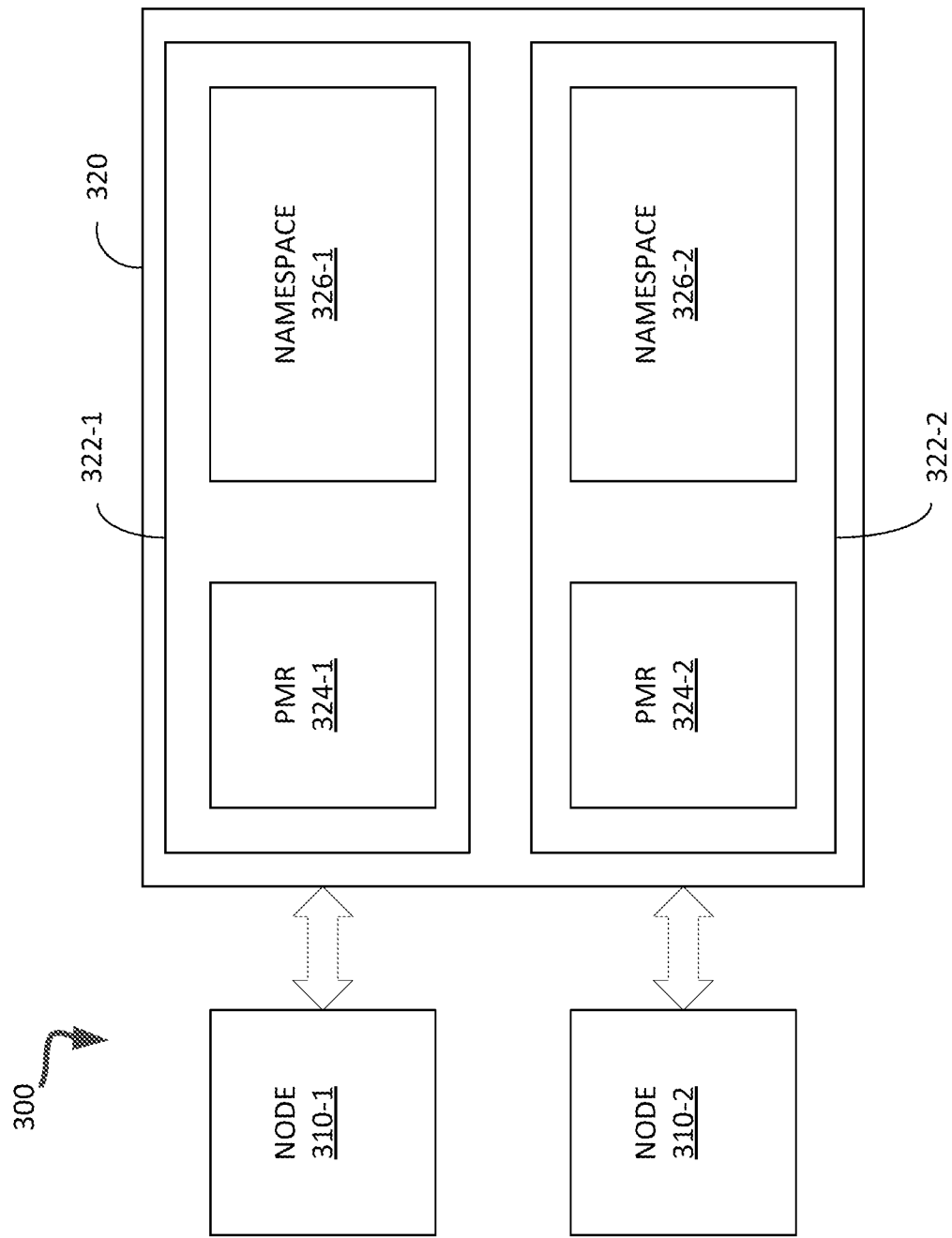
FIG. 3 is a block diagram of a high-level overview of an example system that can implement node coherency for storage related data in accordance with some embodiments of the present disclosure.

FIG. 3 is a block diagram of a high-level overview of a system 300 that can implement node coherency for storage related data, in accordance with some embodiments of the present disclosure.

The system 300 can include a number of nodes (e.g., host systems), including a node 310-1 and a node 310-2, and a memory device 320. For example, the memory device 320 can be an SSD. The nodes 310-1 and 310-2 are attached to the memory device 320 at respective ports (not shown). The memory device 320 includes a number of volumes, including a volume 322-1 and a volume 322-2. Each of the volumes includes a corresponding PMR and namespace. For example, the volume 322-1 includes a PMR 324-1 and a namespace 326-1, and the volume 322-2 includes a PMR 324-2 and a namespace 326-2. The PMR and namespace of a given volume are treated as atomic, meaning that the PMR and namespace of the given volume are not individually reassigned to another node. Accordingly, logic managing the failover process can move or switch the namespace and PMR in the same command.

The "1 PMR per namespace" arrangement illustratively shown in FIG. 3 provides a variety of advantages over the conventional "1 NVDIMM per node" arrangement. For example, each of the PMRs 324-1 and 324-2 is expressed as an entity that is owned by the memory device 320 and is associated to each corresponding namespace 326-1 and 326-2. This is done to avoid the situation in the NVDIMM approach in which the memory is owned by the nodes, which forces mirrors to every owner node. Since the memory is not owned by any of the nodes 310-1 or 310-2, a node failure will not compromise the memory (i.e., no need to mirror copies). Since there is only one PMR per namespace, exposure to any number of nodes can be realized without replication. This is in contrast to the issue of NVDIMM-mirroring across multiple nodes and scaling out to many nodes. Additionally, not having to mirror PMR memory can halve the size needed (e.g., if RDMA uses 32 GB, only 16 GB will now be needed). If data protection across the PMRs is needed for extra care, the PMR data protection can follow a similar model as the storage data protection.

For simplicity, assume there is no sharing (e.g., the volumes 322-1 and 322-2 are not visible) and there are only the nodes 310-1 and 310-2. In a non-shared case, the node 310-1 will only see the PMR 324-1 and the namespace 326-1, and the node 310-2 will only see the PMR 324-2 and the namespace 326-2. Each of the nodes 310-1 and 310-2 can operate on a visible volume without having to coordinate or mirror copy on the other one of the nodes 310-2 and 310-1, respectively.

Suppose now that node 310-1 fails. Node 310-2 will have to pick up both namespace 326-1 and 326-2 and the content of PMR 324-1. In NVDIMM implementations, this meant referring to an internal NVDIMM mirror copy of the node 310-2. In accordance with the embodiments described herein, the same process that will allow namespace failover through the dual ports, as mentioned above, can then expose the same PMR 324-1 through the second port. There is no need of for a mirror and there is the same data integrity as reference data.

Extending to the shared volume case, since all of the volumes are visible through all of the ports, there is no failover at storage level. A node can then pick up a node failure in response to detecting, e.g., "a lack of heartbeat" from another node.

Suppose that there are N nodes or systems exposed through N ports (e.g., through a PCIe or NVMe over Fabrics (NVMe-oF) switch) connected to memory device (e.g., SSD) with N volumes each including a PMR and namespace. When everything is optimal, an i-th node (node) can connect to a corresponding i-th PMR and i-th namepace component using any of the above mechanisms. If node, fails, any other m-th node (node$_m$ where m≠i) can pick up the i-th PMR and i-th namespace through the existing failover of the i-th namespace extended to the i-th PMR per the above description.

Further details regarding systems that can implement node coherency will now be described below with reference to FIGS. 4-6.

Figure 4:
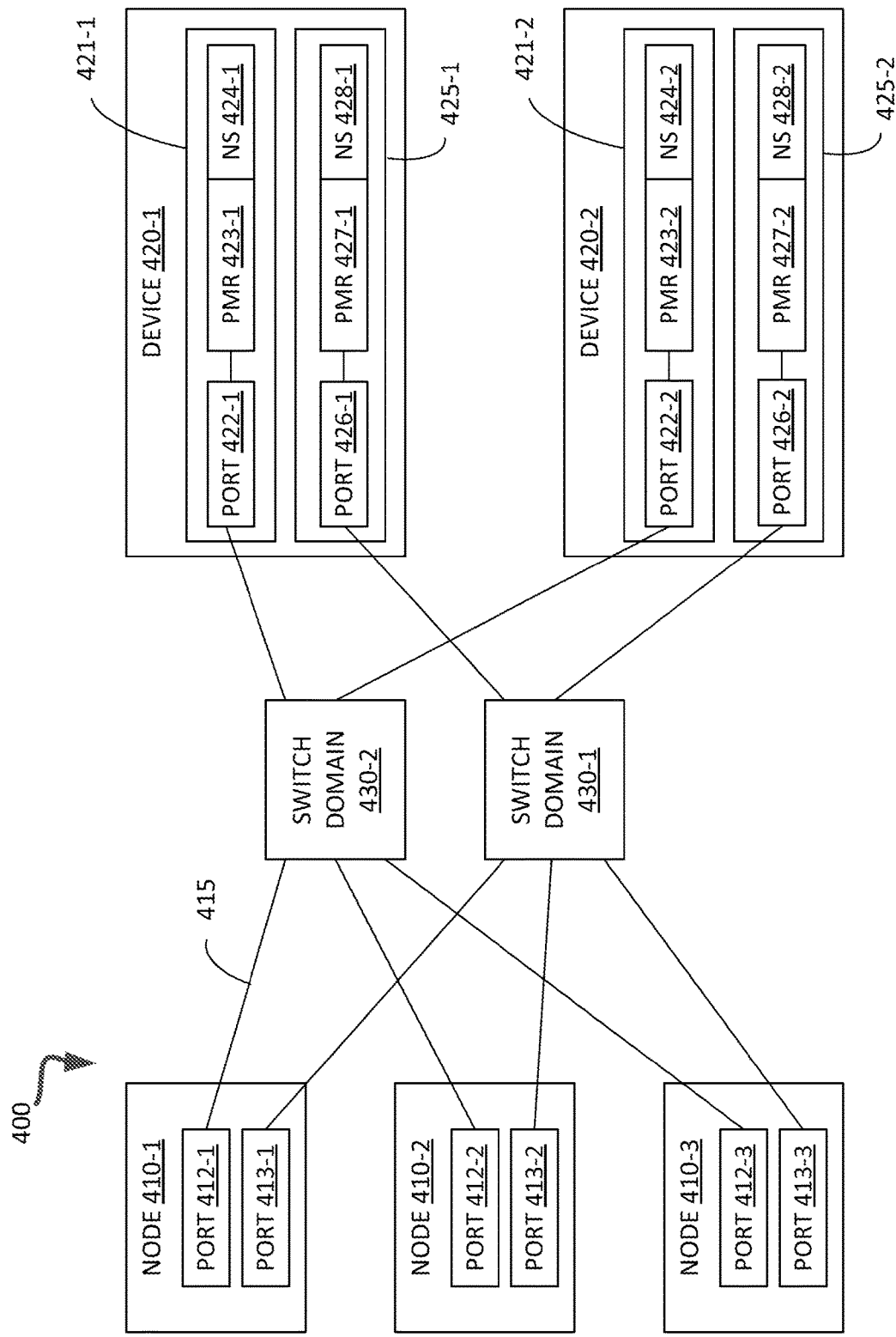
FIG. 4 is a block diagram of an example visibility configuration of a system that can implement node coherency for storage related data in accordance with some embodiments of the present disclosure.

FIG. 4 is a block diagram of a visibility configuration of a system 400 that can implement node coherency for storage related data, in accordance with some embodiments of the present disclosure.

As shown, the system 400 includes a number of nodes (e.g., host systems), including nodes 410-1, 410-2 and 410-3. Although three nodes are shown in FIG. 4, a system can include any suitable number of nodes in accordance with the embodiments described herein.

Each of the nodes includes a pair of ports. For example, node 410-1 includes a port 412-1 and a port 413-1, node 410-2 includes a port 412-2 and a port 413-2, and node 410-3 includes a port 412-3 and a port 414-3. More specifically, each port can correspond to an interface standard. In one embodiment, the interface standard is PCIe. In another embodiment, the interface standard is CXL. However, such embodiments should not be considered limiting.

The system 400 further includes a number of memory devices ("devices"), including device 420-1 and device 420-2. In one embodiment, the memory devices can include SSDs. For example, the memory devices can include NVMe SSD devices. Although two memory devices are shown in FIG. 4, a system can include any suitable number of memory devices in accordance with the embodiments described herein.

Each of the memory devices includes a number of volumes, with each of the volumes including a port operatively coupled to a PMR and a namespace (NS). For example, device 420-1 includes volume 421-1 including port 422-1 operatively coupled to PMR 423-1 and NS 424-1, and volume 425-1 including port 426-1 operatively coupled to PMR 427-1 and NS 428-1. Device 420-2 includes volume 421-2 including port 422-2 operatively coupled to PMR 423-2 and NS 424-2, and volume 425-2 including port 426-2 operatively coupled to PMR 427-2 and NS 428-2. More specifically, each port can correspond to the interface standard (e.g., PCIe or CXL). However, such embodiments should not be considered limiting.

The system 400 further includes a number of switch domains associated with an interface standard, including switch domains 430-1 and 430-2. More specifically, the switch domains can include PCIe switch domains and/or CXL switch domains. However, such embodiments should not be considered limiting. As further shown in FIG. 4, ports 412-1 through 412-3, 422-1 and 422-2 are operatively coupled to switch domain 430-2, and ports 413-1 through 413-3, 426-1 and 426-2 are operatively coupled to switch domain 430-1.

Figure 5:
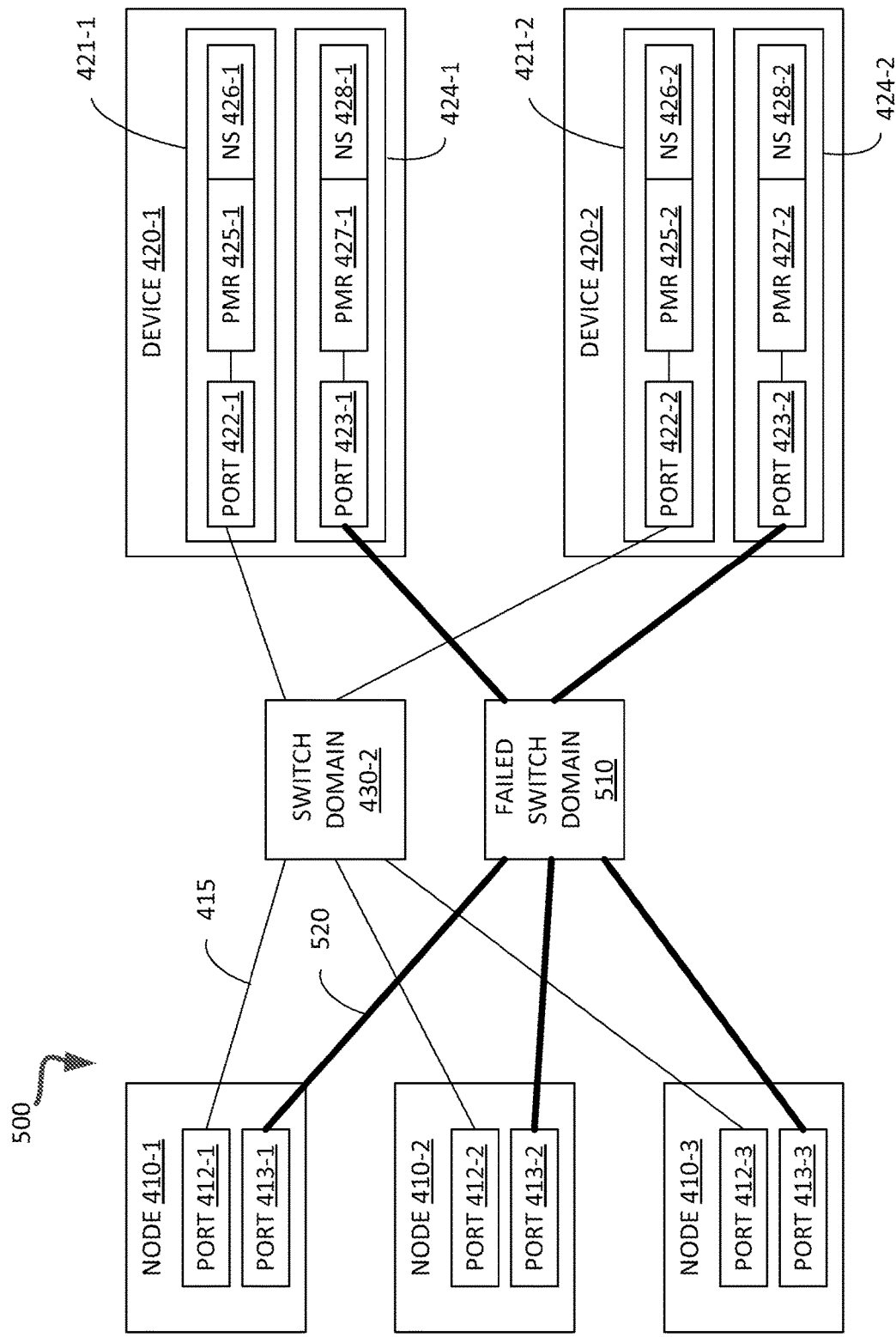
FIG. 5 is a block diagram of the system of FIG. 4 implementing node coherency for storage related data in accordance with some embodiments of the present disclosure.

FIG. 5 is a block diagram of a system 500 implementing node coherency for storage related data, in accordance with some embodiments of the present disclosure. More specifically, in this illustrative example, it is assumed that switch domain 430-1 from FIG. 4 has failed, resulting in failed switch domain 510. The paths to failed switch domain 510 from ports 413-1 through 414-3, 423-1 and 423-2 have correspondingly failed, as noted by the bolded lines 520. As a result, volumes 421-1, 421-2, 424-1 and 424-2 are visible through the remaining paths 415 through switch domain 430-2. More specifically, volume 424-2 has been reassigned to port 412-2, such that port 412-2 now has two volume assignments (i.e., ports 412-2 and previously assigned port 421-2 as described above with reference to FIG. 4).

Figure 6:
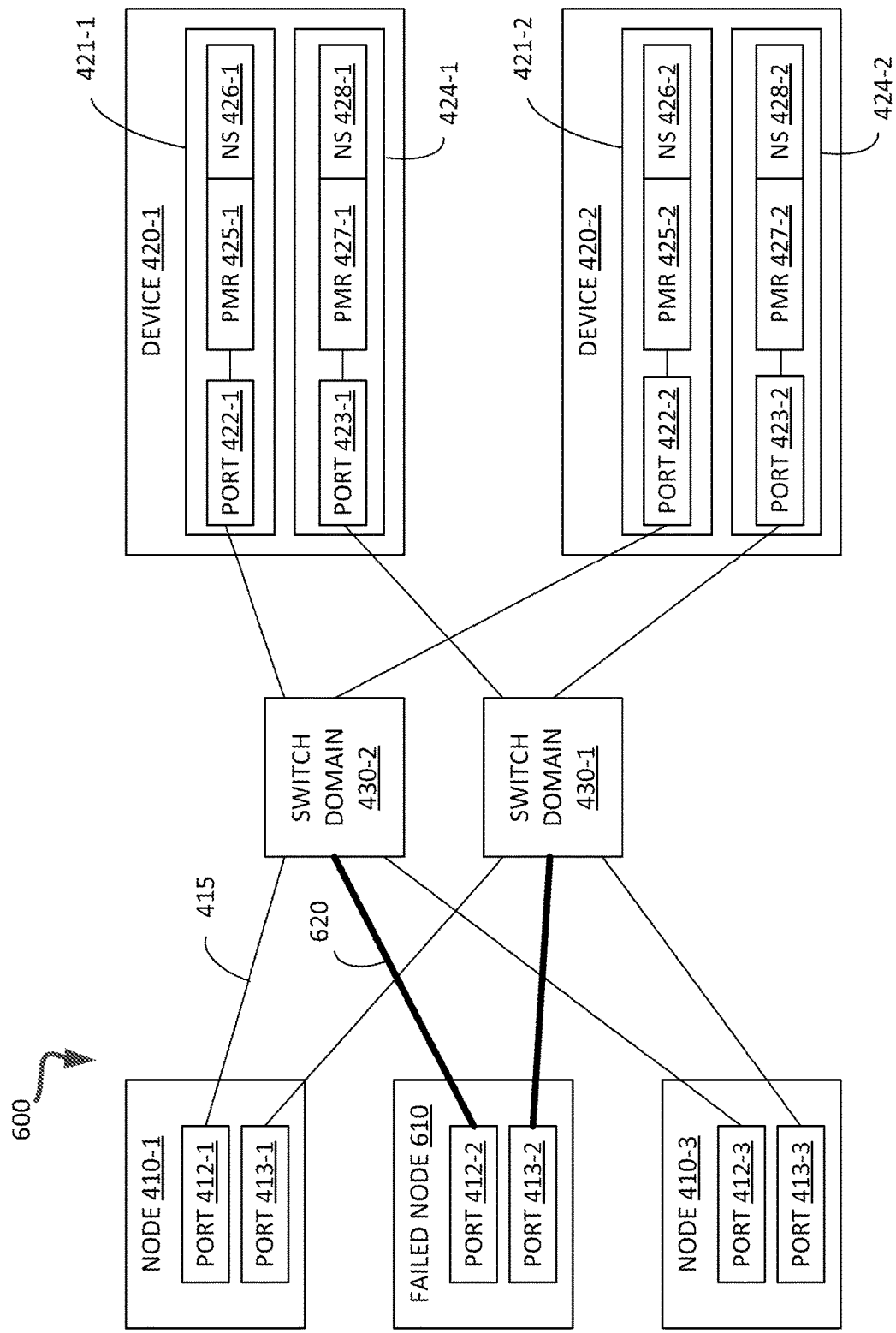
FIG. 6 is a block diagram of the system of FIG. 4 implementing node coherency for storage related data in accordance with some embodiments of the present disclosure.

FIG. 6 is a block diagram of a system 600 implementing node coherency for storage related data, in accordance with some embodiments of the present disclosure. More specifically, in this illustrative example, it is assumed that the node 410-2 from FIG. 4 has failed, resulting in failed node 610. The paths from the ports 412-2 and 412-3 of the failed node 610 are noted by the bolded lines 620. As mentioned above with reference to FIG. 4, volumes 421-2 and 424-2 were visible to node 410-2 when it was properly functioning. Now that node 410-2 has failed into failed node 610, a reconfiguration occurs to cause volumes 421-2 and 424-2 to be visible to alternative nodes. For example, volume 421-2 can be reassigned to port 412-1 to be visible to node 410-1, and volume 424-2 can be reassigned to port 413-3 to be visible to node 410-3. However, such a reconfiguration is purely exemplary and should not be considered limiting.

Figure 7:
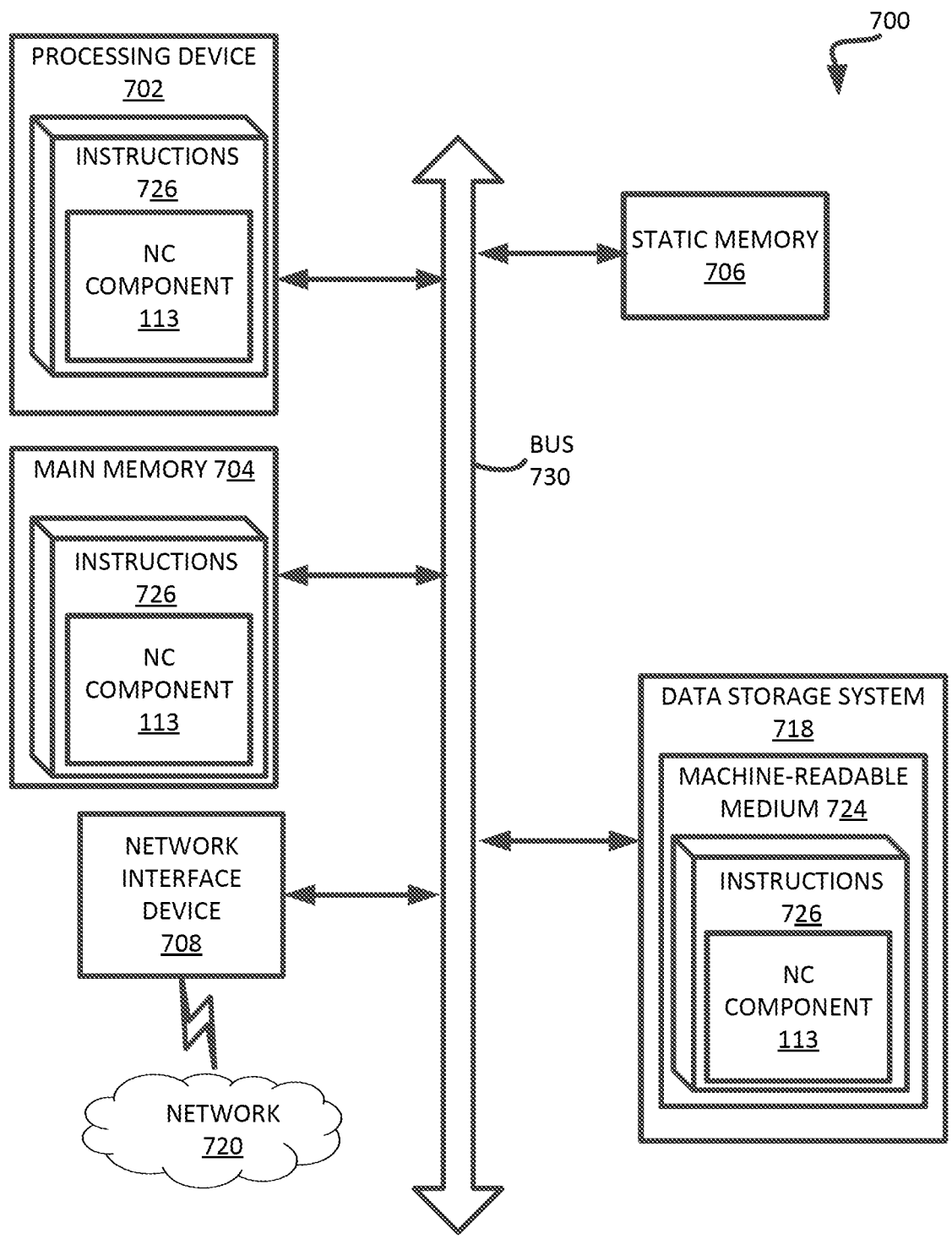
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the NC component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a node coherency component (e.g., the NC component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory; and
a processing device, operatively coupled with the memory, to perform operations comprising:
identifying a system failure affecting visibility, to at least one dual port node of a plurality of dual port nodes, of at least one of a first volume of a plurality of volumes of a first memory device or a second volume of the plurality of volumes, wherein each dual port node of the plurality of dual port nodes comprises a first port and a second port, wherein each volume of the plurality of volumes comprises a persistent memory region (PMR), and wherein identifying the system failure comprises identifying a failure of at least one of: the at least one dual port node of the plurality of dual port nodes, or at least one switch domain of a plurality of switch domains; and modifying a visibility configuration to address the system failure, wherein modifying the visibility configuration comprises modifying the visibility of at least one of the first volume or the second volume to the at least one dual port node of the plurality of dual port nodes through its first port or its second port via the at least one switch domain of the plurality of switch domains.

2. The system of claim 1, wherein:
the visibility configuration comprises visibility of the first volume to a first dual port node of the plurality of dual port nodes and visibility of the second volume to a second dual port node of the plurality of dual port nodes;
identifying the system failure comprises identifying a failure of the first dual port node; and
modifying the visibility configuration to address the system failure comprises causing the first volume to be visible to the second dual port node.

3. The system of claim 1, wherein:
the visibility configuration comprises visibility of a given volume of the plurality of volumes to a first dual port node of the plurality of dual port nodes via the at least one switch domain;
identifying the system failure comprises identifying a failure of the first dual port node; and
modifying the visibility configuration to address the system failure comprises causing the given volume to be visible to a second dual port node of the plurality of dual port nodes via the at least one switch domain.

4. The system of claim 1, wherein:
the visibility configuration comprises visibility of the first volume to a given dual port node of the plurality of dual port nodes through its first port via a first switch domain and visibility of the second volume to the given dual port node through its second port via a second switch domain;
identifying the system failure comprises identifying a failure of the first switch domain; and
modifying the visibility configuration to address the system failure comprises causing the first volume to be visible to the given dual port node through its second port via the second switch domain.

5. The system of claim 1, further comprising:
a second memory device comprising a second plurality of volumes, each volume of the second plurality of volumes having a PMR and a namespace;
wherein:
the plurality of dual port nodes comprises a first dual port node, a second dual port node and a third dual port node;
the second plurality of volumes comprises a third volume and a fourth volume; and
the visibility configuration comprises visibility of the first volume and the second volume to the first dual port node through respective ones of its first port and its second port via respective ones of a first switch domain and a second switch domain, visibility of the third volume to the second dual port node through its first port via the first switch domain, and visibility of the fourth volume to the third dual port node through its second port via the second switch domain.

6. The system of claim 5, wherein:
identifying the system failure comprises identifying a failure of the first dual port node; and
modifying the visibility configuration to address the system failure comprises causing the first volume to be visible to the second dual port node through its second port via the second switch domain, and causing the second volume to be visible to the third dual port node through its first port via the first switch domain.

7. The system of claim 5, wherein:
identifying the system failure comprises identifying a failure of the first switch domain; and
modifying the visibility configuration to address the system failure comprises causing the first volume to be visible to the first dual port node through its second port via the second switch domain, and the third volume to be visible to the second dual port node through its second port via the second switch domain.

8. A method comprising:
identifying, by a processing device, a system failure affecting visibility, to at least one dual port node of a plurality of dual port nodes, of at least one of a first volume of a plurality of volumes of a first memory device or a second volume of the plurality of volumes, wherein each dual port node of the plurality of dual port nodes comprises a first port and a second port, wherein each volume of the plurality of volumes comprises a persistent memory region (PMR), and wherein identifying the system failure comprises identifying a failure of at least one of: the at least one dual port node of the plurality of dual port nodes, or at least one switch domain of a plurality of switch domains; and
modifying, by the processing device, a visibility configuration to address the system failure, wherein modifying the visibility configuration comprises modifying the visibility of at least one of the first volume or the second volume to the at least one dual port node of the plurality of dual port nodes through its first port or its second port via the at least one switch domain of the plurality of switch domains.

9. The method of claim 8, wherein:
the visibility configuration comprises visibility of the first volume to a first dual port node of the plurality of dual port nodes and visibility of the second volume to a second dual port node of the plurality of dual port nodes;
identifying the system failure comprises identifying a failure of the first dual port node; and
modifying the visibility configuration to address the system failure comprises causing the first volume to be visible to the second dual port node.

10. The method of claim 8, wherein:
the visibility configuration comprises visibility of a given volume of the plurality of volumes of to a first dual port node of the plurality of dual port nodes via the at least one switch domain;
identifying the system failure comprises identifying a failure of the first dual port node; and
modifying the visibility configuration to address the system failure comprises causing the given volume to be visible to a second dual port node of the plurality of dual port nodes via the at least one switch domain.

11. The method of claim 8, wherein:
the visibility configuration comprises visibility of the first volume to a given dual port node of the plurality of dual port nodes through its first port via a first switch domain and visibility of the second volume to the given dual port node through its second port via a second switch domain;
identifying the system failure comprises identifying a failure of the first switch domain; and
modifying the visibility configuration to address the system failure comprises causing the first volume to be visible to the given dual port node through its second port via the second switch domain.

12. The method of claim 8, wherein:
the plurality of dual port nodes comprises a first dual port node, a second dual port node and a third dual port node;
the system further comprises a second memory device comprising a second plurality of volumes, each volume of the second plurality of volumes having a PMR and a namespace, and the second plurality of volumes comprising a third volume and a fourth volume; and
the visibility configuration comprises visibility of the first volume and the second volume to the first dual port node through respective ones of its first port and its second port via respective ones of a first switch domain and a second switch domain, visibility of the third volume to the second dual port node through its first port via the first switch domain, and visibility of the fourth volume to the third dual port node through its second port via the second switch domain.

13. The method of claim 12, wherein:
identifying the system failure comprises identifying a failure of the first dual port node; and
modifying the visibility configuration to address the system failure comprises causing the first volume to be visible to the second dual port node through its second port via the second switch domain, and causing the second volume to be visible to the third dual port node through its first port via the first switch domain.

14. The method of claim 12, wherein:
identifying the system failure comprises identifying a failure of the first switch domain; and
modifying the visibility configuration to address the system failure comprises causing the first volume to be visible to the first dual port node through its second port via the second switch domain, and the third volume to be visible to the second dual port node through its second port via the second switch domain.

15. A non-transitory computer-readable storage medium comprising instructions that, when executed by a processing device, cause the processing device to perform operations comprising:
identifying a system failure affecting visibility, to at least one dual port node of a plurality of dual port nodes, of at least one of a first volume of a plurality of volumes of a first memory device or a second volume of the plurality of volumes, wherein each dual port node of the plurality of dual port nodes comprises a first port and a second port, wherein each volume of the plurality of volumes comprises a persistent memory region (PMR), and wherein identifying the system failure comprises identifying a failure of at least one of: the at least one dual port node of the plurality of dual port nodes, or at least one switch domain of a plurality of switch domains; and
modifying a visibility configuration to address the system failure, wherein modifying the visibility configuration comprises modifying the visibility of at least one of the first volume or the second volume to the at least one dual port node of the plurality of dual port nodes through its first port or its second port via the at least one switch domain of the plurality of switch domains.

16. The non-transitory computer-readable storage medium of claim 15, wherein:
the visibility configuration comprises visibility of the first volume to a first dual port node of the plurality of dual port nodes and visibility of the second volume to a second dual port node of the plurality of dual port nodes; and
the system failure comprises a failure of the first dual port node.

17. The non-transitory computer-readable storage medium of claim 15, wherein:
the visibility configuration comprises visibility of a given volume of the plurality of volumes to a first dual port node of the plurality of dual port nodes via the at least one switch domain; and
the system failure comprises a failure of the first dual port node.

18. The non-transitory computer-readable storage medium of claim 15, wherein:
the visibility configuration comprises visibility of the first volume to a given dual port node of the plurality of dual port nodes through its first port via a first switch domain and visibility of the second volume to the given dual port node through its second port via a second switch domain; and
the system failure comprises a failure of the first switch domain.

19. The non-transitory computer-readable storage medium of claim 15, wherein:
the plurality of dual port nodes comprises a first dual port node, a second dual port node and a third dual port node;
the system further comprises a second memory device comprising a second plurality of volumes, each volume of the second plurality of volumes having a PMR and a namespace, and the second plurality of volumes comprising a third volume and a fourth volume;
the visibility configuration comprises visibility of the first volume and the second volume to the first dual port node through respective ones of its first port and its second port via respective ones of a first switch domain and a second switch domain, visibility of the third volume to the second dual port node through its first port via the first switch domain, and visibility of the fourth volume to the third dual port node through its second port via the second switch domain; and
the system failure comprises a failure of the first dual port node.

20. The non-transitory computer-readable storage medium of claim 15, wherein:
the plurality of dual port nodes comprises a first dual port node, a second dual port node and a third dual port node;
the system further comprises a second memory device comprising a second plurality of volumes, each volume of the second plurality of volumes having a PMR and a namespace, and the second plurality of volumes comprising a third volume and a fourth volume;
the visibility configuration comprises visibility of the first volume and the second volume to the first dual port node through respective ones of its first port and its second port via respective ones of a first switch domain and a second switch domain, visibility of the third volume to the second dual port node through its first port via the first switch domain, and visibility of the fourth volume to the third dual port node through its second port via the second switch domain; and the system failure comprises a failure of the first switch domain.

* * * * *